United States Patent
Kawase et al.

(10) Patent No.: US 7,278,906 B2
(45) Date of Patent: Oct. 9, 2007

(54) ADHESIVE TAPE AND EDGING METHOD USING SAME

(75) Inventors: Akiko Kawase, Minowa-machi (JP); Hiroshi Katagiri, Naganoken (JP); Keiichi Suzuki, Naganoken (JP); Katsuyoshi Takeshita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/899,047

(22) Filed: Jul. 27, 2004

(65) Prior Publication Data

US 2005/0042977 A1 Feb. 24, 2005

Related U.S. Application Data

(63) Continuation of application No. PCT/JP03/15192, filed on Nov. 27, 2003.

(30) Foreign Application Priority Data

Jan. 27, 2003 (JP) ............................. 2003-017552
Nov. 20, 2003 (JP) ............................. 2003-390682

(51) Int. Cl.
*B24B 1/00* (2006.01)
*B24B 7/19* (2006.01)
*B24B 7/30* (2006.01)
*B24B 7/00* (2006.01)
*B24B 9/00* (2006.01)
*B24B 41/06* (2006.01)

(52) U.S. Cl. ........................... 451/43; 451/41; 451/42; 451/54; 451/384; 451/240

(58) Field of Classification Search ............ 451/41–43, 451/29, 54, 384, 240
See application file for complete search history.

(56) References Cited

U.S. PATENT DOCUMENTS 3,631,637 A * 1/1972 Tagnon .................... 451/390

(Continued)

FOREIGN PATENT DOCUMENTS

DE          4300673 A1       7/1994

(Continued)

OTHER PUBLICATIONS

Search Report from the Singaporean Patent Office dated Nov. 11, 2005.
Computer-generated English Translation of JP 2003-311595.
Computer-generated English Translation of JP 2003-171625.

(Continued)

*Primary Examiner*—Joseph J. Hail, III
*Assistant Examiner*—Bryan R. Muller
(74) *Attorney, Agent, or Firm*—Sughrue Mion, PLLC (57) ABSTRACT

An adhesive tape which is to be arranged between a lens and at least one of a plurality of chucks in an edge-machining apparatus comprises an adhesive face for being in contact with the lens. A measurement of an adhesive strength of the adhesive face is 4 gf (0.0392 N) or more when a polyethylene terephthalate plate which has been subjected to a surface treatment with a fluorine-modified silicone parting agent is used as a test plate in an adhesive strength test method based on a 180°-peeling method as defined in JIS Z 0237 "adhesive tape/adhesive sheet test method". A technique which can be used to edge the lens in which an antifouling layer is formed by using a fluorine-containing silane compound having an excellent antifouling effect is also provided.

6 Claims, 5 Drawing Sheets

U.S. PATENT DOCUMENTS

| | | | |
|---|---|---|---|
| 5,165,202 A * | 11/1992 | Spindel, Jr. | 451/240 |
| 5,341,604 A * | 8/1994 | Wood | 451/5 |
| 5,429,838 A * | 7/1995 | Mansson et al. | 427/2.24 |
| 5,883,169 A * | 3/1999 | Spector et al. | 524/292 |
| 5,928,718 A * | 7/1999 | Dillon | 427/164 |
| 6,074,290 A * | 6/2000 | Ko et al. | 451/390 |
| 2002/0149862 A1 | 10/2002 | Wallendorf et al. | |

FOREIGN PATENT DOCUMENTS

| | | |
|---|---|---|
| JP | 05-078627 A | 3/1993 |
| JP | 6-24852 U | 4/1994 |
| JP | 4-60923 A | 5/1994 |
| JP | 08-229794 A | 9/1996 |
| JP | 8-229794 A | 9/1996 |
| JP | 09-258003 A | 10/1997 |
| JP | 09258003 A * | 10/1997 |
| JP | 2000-24936 A | 1/2000 |
| JP | 2000-024936 A | 1/2000 |
| JP | 2000-309759 A | 11/2000 |
| JP | 2001-011396 A | 1/2001 |
| JP | 2001-64608 A | 3/2001 |
| JP | 3275147 B1 | 2/2002 |
| JP | 2002-263998 A | 9/2002 |
| JP | 2003-171625 A | 6/2003 |
| JP | 2003-311595 A | 11/2003 |
| JP | 2004-122238 A | 4/2004 |
| JP | 2004-347660 A | 9/2004 |
| WO | WO 03/092957 A1 | 11/2003 |

OTHER PUBLICATIONS

Computer-generated English Translation of JP 2001-64608.
An Office Action issued in a related foreign application dated Aug. 15, 2006.
Computer generated English Translation of JP 2001-011396.
Computer generated English Translation of JP 2000-309759.
Computer generated English Translation of JP 05-078627.
Computer generated English Translation of JP 3275147.

* cited by examiner

INTEGRAL TYPE OF A BLOCK TAPE AND AN ADHESIVE TAPE FOR EDGING

FIG. 3C

INTEGRAL TYPE OF A BLOCK TAPE AND AN ADHESIVE TAPE FOR EDGING

PRIOR ART

ADHESIVE TAPE AND EDGING METHOD USING SAME

This application is a Continuation application of the international application PCT/JP03/015192 filed Nov. 27, 2003 and claims priority from Japan 2003-017552 filed Jan. 27, 2003 and Japan 2003-390682 filed Nov. 20, 2003, all of which is incorporated herein by reference.

TECHNICAL FIELD

The present invention relates to an adhesive tape for use in edging and an edging method and, particularly, to an adhesive tape favorable for edging of a lens provided with an antifouling layer and an edging method.

BACKGROUND OF THE INVENTION

In order to suppress reflection of light or increase transmittance of the light, a reflection reducing coating is ordinarily formed on a surface of a lens, such as a spectacle lens. There is a problem in that, at the time of use, a stain derived from adherence of, for example, dirt from a hand, a fingerprint, perspiration, or cosmetic is conspicuous and it is hard to remove the stain. In coping with this problem, in order to prevent the stain from adhering or to facilitate removal of the stain whenever adhered, an antifouling layer has further been provided on a surface of the reflection reducing coating.

With regard to a surface treating agent for providing the antifouling layer on the spectacle lens, a fluorine-containing silane compound which is described in JP-A No. 9-258003 to form the antifouling layer is favorable in terms of the antifouling property. Further, the effect thereof lasts long.

However, the lens which has been subjected to the surface treatment with the fluorine-containing silane compound as described in the above publication has an extremely small friction coefficient compared to that obtained by using a conventional surface treating agent. Therefore, the surface of the lens has such a characteristic as being too slippery. Due to this characteristic, a problem as described below occurs when the lens is subjected to edging. At a retail shop of spectacles, grinding a round spectacle lens to be in a shape in which the lens can be inserted in a spectacle frame, namely, so-called edging has been performed.

In the edging, first, a machining center of the spectacle lens is sucked and held by chucks of an edge-machining apparatus. In another case, the machining center of the spectacle lens is clamped while being applied with pressure from both sides of the lens. In a manner as described above, an edge of the spectacle lens is ground by a grinding stone while the spectacle lens is held by a frictional force. Since the surface of the lens held by the chucks has good slipperiness, when the lens is ground by a grinding stone, the lens slips out of position, due to a grinding pressure of the grinding stone against the chucks, namely, a so-called axial misalignment occurs. This causes a problem in that precise edging can not be performed.

Under these circumstances, the present invention has been achieved and has an object to provide a technique capable of allowing edging a lens on which an antifouling layer has been formed by using a fluorine-containing silane compound excellent in an antifouling effect.

SUMMARY OF THE INVENTION

In order to attain the aforementioned object, the present inventors have exerted an intensive study and, as a result, have found an adhesive tape having an excellent adhesive strength against an antifouling layer on a surface of a lens with which chucks of an edge-machining apparatus are allowed to be in contact.

The present inventors have conducted a test by using a stainless steel plate as a test plate as described in an adhesive strength test of an adhesive tape in JIS Z 0237 "adhesive tape/adhesive sheet test method". However, as a result, it has been found that there is no difference at all between a measurement value of the adhesive strength of the adhesive tape having an excellent adhesive strength and a measurement value of the adhesive strength of the adhesive tape having an inferior adhesive strength against the lens on which the antifouling layer has been provided.

Therefore, the present inventors have studied a method for distinguishing from others, the adhesive tape having the excellent adhesive strength against the lens on which the antifouling layer is formed by using the fluorine-containing silane compound. Specifically, the present inventors have conducted a test of the adhesive strength of an adhesive tape by using a polyethylene terephthalate plate which has been subjected to a surface treatment by using a fluorine-modified silicone parting agent as a test plate.

As a result, it has been found that, by using the latter plate rather than the stainless steel plate as a test plate, a difference appears between measurement values of an adhesive tape having an excellent adhesive strength and that having an inferior adhesive strength against the spectacle lens on which the antifouling layer has been provided.

Further, when the adhesive tape has an adhesive strength of 4 gf or more in the adhesive strength test using this test plate, it has been found that the adhesive tape is favorably attached to the spectacle lens on which the antifouling layer is formed by using the fluorine-containing silane compound. Still further, when the adhesive tape having an adhesive strength of 4 gf or more is interposed between the chuck of the edge-machining apparatus and the lens, it has been found that edging can be performed without generating an axial misalignment.

At the time of edging, a method of holding the lens by applying pressure by the chuck of the edge-machining apparatus from both sides of the lens is adopted. In such case, in a progressive multifocal lens, by attaching the adhesive tape to the concave face of the lens, it is not necessary to attach the adhesive tape on the convex face of the lens on which various types of layout marks have been applied. Accordingly, the edging can be performed without the need of removing the layout marks.

Further, when the adhesive tape is attached to the convex face of a progressing multifocal spectacle lens, in order to avoid a mark of a fitting point which has been applied, it is preferable to provide a bored-through hole in a center portion of the adhesive tape.

The adhesive tape according to the present invention is an adhesive tape which is provided between a lens and at least one of a plurality of chucks in an edge-machining apparatus and comprises an adhesive face for being in contact with the lens. Generally, the plurality of chucks represents a pair. Further, a measurement value of the adhesive strength of the adhesive face is 4 gf (0.0392 N) or more when a polyethylene terephthalate plate which has been subjected to a surface treatment with a fluorine-modified silicone parting agent is used as a test plate in an adhesive strength test method based on a 180°-peeling method as defined in JIS Z 0237 "adhesive tape/adhesive sheet test method".

In one embodiment, a bored-through hole is provided in the central portion of the adhesive tape according to the present invention. An edging method according to the present invention attaches an adhesive tape on an antifouling layer of a lens in which the antifouling layer is provided. Then, the lens is held by a plurality of chucks such that the adhesive tape is interposed between the lens and at least one of the plurality of chucks in an edge-machining apparatus. Thereafter, edging of the lens is performed by the edge-machining apparatus.

Preferably, the adhesive tape comprises an adhesive face for being contact with the lens. And, a measurement value of an adhesive strength of the adhesive face is 4 gf (0.0392 N) or more when a polyethylene terephthalate plate which has been subjected to a surface treatment with a fluorine-modified silicone parting agent is used as a test plate in an adhesive strength test method based on a 180°-peeling method as defined in JIS Z 0237 "adhesive tape/adhesive sheet test method".

More preferably, the antifouling layer is formed by using as a main component a fluorine-containing silane compound as represented by the following general formula (1):

wherein $R_f$ represents a straight or branched perfluoroalkyl group having from 1 to 16 carbon atoms;

X represents iodine or hydrogen;

Y represents hydrogen or a lower alkyl group;

Z represents fluorine or a trifluoromethyl group;

$R^1$ represents a hydrolysable group;

$R^2$ represents hydrogen or an inactive monovalent organic group;

a, b, c, and d each individually represent an integer of from 0 to 200;

e represents 0 or 1;

m and n each individually represent an integer of from 0 to 2; and p represents an integer of from 1 to 10.

In another embodiment, the edging method comprises a step of attaching the adhesive tape to the concave face of a lens.

The adhesive tape according to the present invention is an adhesive tape which is provided between a lens and at least one of a plurality of chucks in an edge-machining apparatus and comprises an adhesive face for being in contact with the lens. When an adhesive strength of the adhesive face is measured based on a predetermined test method, a measurement value of an adhesive strength is 4 gf (0.0392 N) or more. The predetermined test method is basically same as an adhesive strength test method based on a 180°-peeling method as defined in JIS Z 0237 "adhesive tape/adhesive sheet test method", except for replacing a test plate used in the adhesive strength test method based on a 180°-peeling method as defined in JIS Z 0237 "adhesive tape/adhesive sheet test method" by a polyethylene terephthalate plate which has been subjected to a surface treatment with a fluorine-modified silicone parting agent.

DETAILED DESCRIPTION OF THE INVENTION

"JIS Handbook 29 Adhesion"; Japanese Standards Association, Jan. 31, 2002, and "JIS Handbook on Steel"; Japanese Standards Association, Apr. 12, 1989 are incorporated herein by reference in their entirety.

Embodiments of an adhesive tape for edging and an edging method according to the present invention are described below, but the present invention is by no means limited thereto.

Edging of a spectacle lens, also known as edge machining, includes grinding an edge of a round spectacle lens by a grinding stone such that the spectacle lens can be inserted in a spectacle frame. The spectacle lens is a meniscus lens which has a convex face on the side of an object and the concave face on the side of an eye ball.

Figure 5:
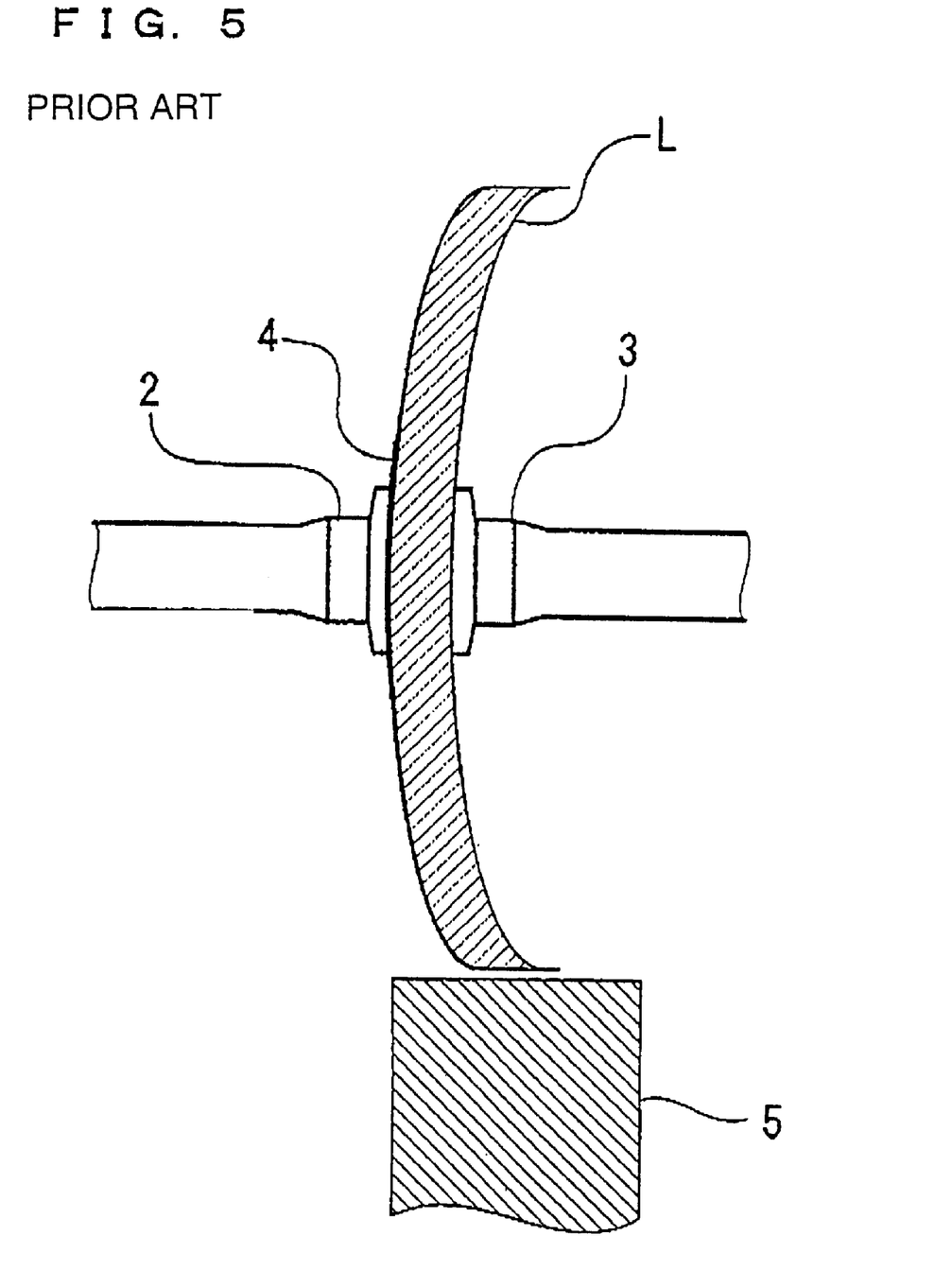
FIG. 5 is a schematic diagram showing an edging method.

FIG. 5 shows an edging method of a lens to be performed by using an edge-machining apparatus. In the edging method, first, the lens L is applied with pressure such that the lens L is sandwiched from both sides of an optical axis of the lens by chucks 2, 3 of an edge-machining apparatus. On this occasion, a lens lock tape 4 is ordinarily attached to the convex face side of the lens L for the purpose of scar prevention and machining positioning and a chuck 2 on the convex face side of the lens L presses against a surface of the lens L via the lens lock tape 4. After the lens is fixed to the chucks 2 and 3, the edge machining is performed by using the grinding stone 5 based on frame data.

On the other hand, the spectacle the lens which has been subjected to a surface treatment with a fluorine-containing silane compound as described in the aforementioned publication has a small friction coefficient compared with that treated with a conventional surface treating agent and, accordingly, has a characteristic of being too slippery. At the time of edging, due to the characteristic of the surface of the lens L held by the chucks 2 and 3 being too slippery, there is a problem in that, when the lens L is ground by a grinding stone 5, the lens L slips out of position with respect to the chucks 2 and 3 by a grinding pressure, namely, an axial misalignment occurs and, accordingly, a precise edging can not be performed.

In order to solve the problem, the adhesive tape according to the present invention is attached to the spectacle lens at the time of edging. Specifically, the adhesive tape according to the present invention is used such that it is interposed between the chucks, which hold the spectacle lens, of the edge-machining apparatus and the spectacle lens.

Figure 1A:
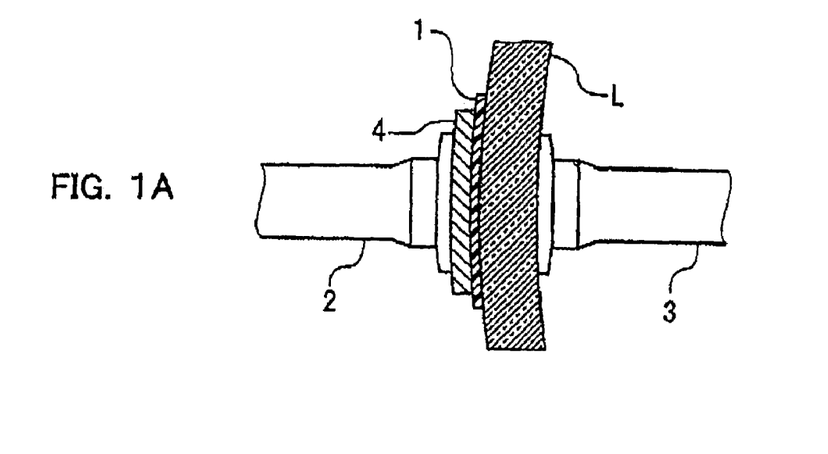
FIG. 1(A) is a cross-sectional diagram showing an edging method using an adhesive tape for edging according to the present invention in a case in which the adhesive tape for edging is attached to a convex face of a lens.
Figure 1B:
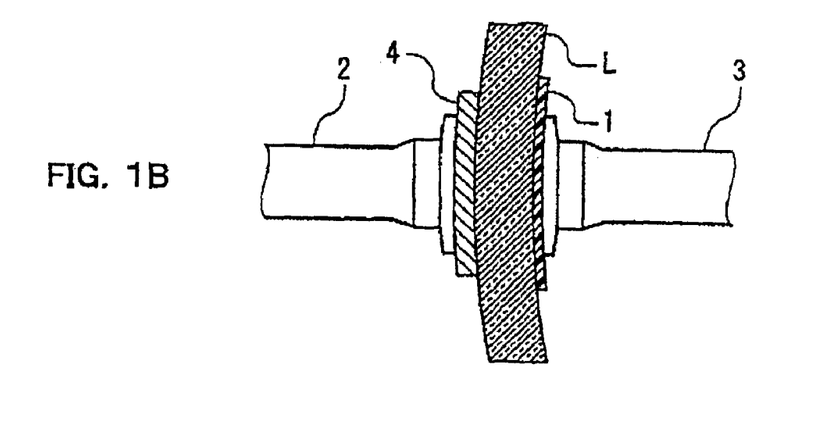
FIG. 1(B) is a cross-sectional diagram showing an edging method using an adhesive tape for edging according to the present invention in a case in which the adhesive tape for edging is attached to the concave face of the lens.
Figure 1C:
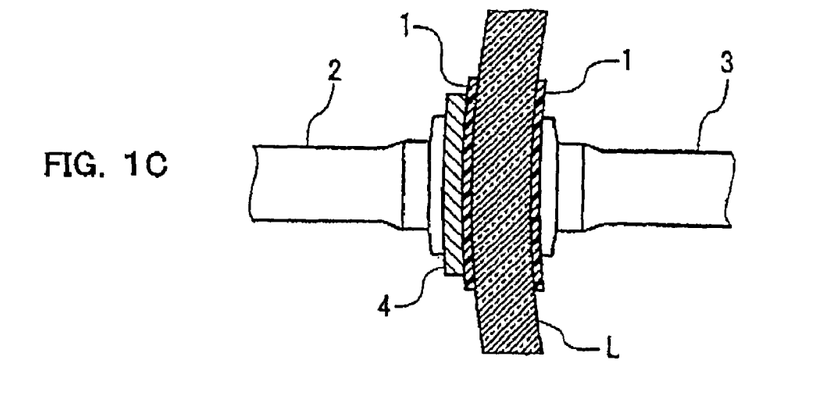
FIG. 1(C) is a cross-sectional diagram showing an edging method using an adhesive tape for edging according to the present invention in a case in which the adhesive tape for edging is attached to both faces of the lens.

FIGS. 1 show three embodiments of an edging method which uses an adhesive tape 1 for edging. Further, the adhesive tape 1 for edging of the present embodiment corresponds to the adhesive tape according to the present invention.

In a configuration as shown in FIG. 1(A), the adhesive tape 1 for edging is positioned on a convex face of the spectacle lens L. And, a lens lock tape 4 is positioned on the adhesive tape 1 for edging. Further, a lens holding member (not shown) is positioned on the lens lock tape 4. In this configuration, the adhesive tape 1 for edging, the lens lock tape 4, and the lens holding member cover the machining center of the spectacle lens L. And, a chuck 2 presses against the lens lock tape 4 to the side of a chuck 3 via the lens holding member while a chuck 3 presses against the spectacle lens L to the side of the chuck 2. In such a manner as described above, a position of the spectacle lens L is fixed against the chucks 2, and 3. Further, respective central positions of chucks 2 and 3 of the edge-machining apparatus correspond to the machining central portion of the spectacle lens L.

Still further, in the present embodiment, the chucks 2 and 3 are also expressed as "lens fixing device".

Figure 4:
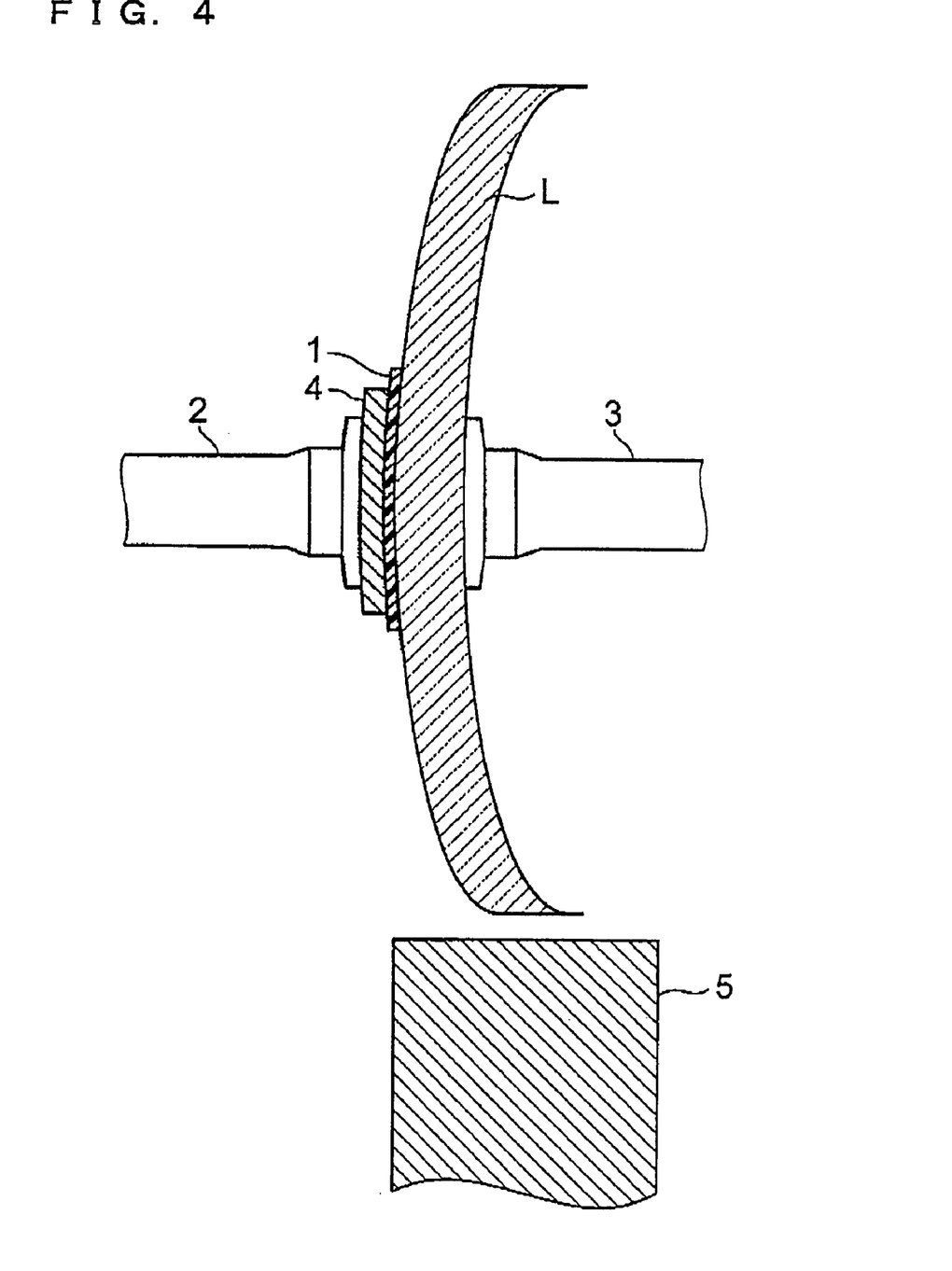
FIG. 4 is a schematic diagram showing an edging method.

A method of edging the spectacle lens L by using the configuration as shown in FIG. 1(A) is described below. First, the adhesive tape 1 for edging is attached onto the convex face of the spectacle lens L such that it covers the machining central portion. Then, the lens lock tape 4 is attached onto the adhesive tape 1 for edging. Thereafter, the lens holding member is attached onto the lens lock tape 4. Subsequently, the lens L which is provided with the adhesive tape 1 for edging, the lens lock tape 4 and the lens holding member are inserted between the chucks 2 and 3 of the edge-machining apparatus. Then, by clamping the lens holding member, the lens lock tape 4, the adhesive tape 1 for edging, and the lens L with the chucks 2 and 3, a position of the lens L is fixed. On this occasion, the chucks 2 and 3 and the spectacle lens L are allowed to be positioned with one another such that the respective central positions of the chucks 2 and 3 correspond to the machining central portion of the spectacle lens L. Thereafter, a rotating grinding stone 5 is allowed to be in contact with the spectacle lens L to perform the edging of the spectacle lens L as shown in FIG. 4.

In the configuration as shown in FIG. 1(B), the adhesive tape 1 for edging is positioned on the concave face of the spectacle lens L, whereas the lens lock tape 4 is positioned on the convex face of the spectacle lens L. Then, the chuck 2 presses against the lens lock tape 4 to the side of the chuck 3 via the lens holding member (not shown) and, also, the chuck 3 presses against the adhesive tape 1 for edging to the side of the chuck 2 to thereby fix the position of the spectacle lens L.

Further, the adhesive tape 1 for edging, the lens lock tape 4 and the lens holding member cover the machining central portion of the spectacle lens L. The rotating grinding stone 5 is allowed to be in contact with the spectacle lens L thus held to perform edging of the spectacle lens L.

In the configuration as shown in FIG. 1(C), the adhesive tape 1 for edging is positioned on each of the convex and concave faces of the spectacle lens L. Then, the lens lock tape 4 is positioned on the adhesive tape 1 for edging on the convex face, and the lens holding member (not shown) is provided on the lens lock tape 4. And, the chuck 2 presses against the lens lock tape 4 to the side of the chuck 3 via the lens holding member and, at the same time, the chuck 3 presses against the adhesive tape 1 for edging of the concave side to the side of the chuck 2 to thereby fix the position of the spectacle lens L. Further, two adhesive tapes 1 for edging cover the machining central portion of the spectacle lens L. And, then, a rotating grinding stone 5 is allowed to be in contact with the spectacle lens 1 which is held in the manner as described above to perform edging of the spectacle lens L.

In FIGS. 1(A) and 1(C), the adhesive tape 1 for edging is attached onto the convex face of the spectacle lens L. Further, the lens lock tape 4 is attached onto the adhesive tape 1 for edging to perform the edging. Still further, when the lens lock tape 4 is not used for the purpose of positioning, it is possible to omit the lens lock tape 4. Still further, when the adhesive layer is formed on the face of a lens opposite to the face of the adhesive tape 1 for edging, it can concurrently be used for the purpose of positioning. Therefore, it is possible to omit the lens lock tape 4.

Further, the lens holding member of the present embodiment has a biting tooth on the side which is in contact with the lens lock tape 4. Since this biting tooth bites into the lens lock tape 4, the lens L can be assuredly held at the time of the lens machining. However, the biting tooth of the lens holding member may be omitted or the lens holding member itself may be omitted, depending on a rotation speed of the lens L or strength of torque to be generated by a friction between the grinding stone 5 (see FIG. 4) and the lens L at the time of the lens machining. The structure of the lens holding member is described in detail in JP-U No. 6-24852, the disclosure of which is incorporated herein by reference.

The adhesive tape 1 for edging according to the present embodiment is used, as described above, such that it is attached to only the concave face, only the convex face, or both of the concave and convex faces of the spectacle lens which is subjected to an antifouling treatment at the time of edging. Specifically, the adhesive tape 1 is used such that it is interposed between the chuck of the edge-machining apparatus, which holds the spectacle lens, and the spectacle lens. As a result, a problem that the lens is out of position against the chuck, namely, an axial misalignment, can be prevented.

The adhesive tape 1 for edging is tested by using a polyethylene terephthalate plate which has been subjected to a surface treatment with a fluorine-modified silicone parting agent as a test plate in an adhesive test method based on 180°-peeling method as defined in JIS Z 0237 "adhesive tape/adhesive sheet test method" ("JIS Handbook 29 Adhesion"; Japanese Standards Association, Jan. 31, 2002). The adhesive strength of the adhesive tape 1 for edging measured at that time is 4 gf (0.0392 N) or more.

An outline of the adhesive strength test method based on the 180°-peeling method as defined in JIS Z 0237 "adhesive tape/adhesive sheet test method" is described below. A test is performed under the following standard condition: a temperature in a test place of 23±2° C.; and a relative humidity of 65±5%. A sample must be left for 2 hours or more in an atmosphere of the standard conditions.

The test piece is cut into a tape having a width of 25 mm or more or a sheet having a width of 25 mm. When the tape is less than 25 mm wide, the tape is used in its original width. Three test pieces each having such width as described above and a length of about 250 mm are selected.

A tensile testing machine as defined in JIS B 7721 is used. As for a test plate, an SUS 304 or SUS 302 steel plate having a thickness of from 1.5 to 2.0 mm as defined in JIS G 4305, a width of 50 mm and a length of 125 mm is used. A hand-operated roller is used as a pressing apparatus. The surface of the hand-operated roller is covered with a rubber layer having a spring hardness of 80±5 Hs and a thickness of about 6 mm as defined in JIS K 6301. The hand-operated roller has a width of about 45 mm, a diameter of about 83 mm, and a mass of 2000±50 g.

The test pieces are placed on a previously cleaned test plate such that adhesive faces thereof face downward, and are aligned with one another at one end thereof with a remaining portion of 125 mm in length being set free. The adhesive face of the remaining portion is applied with talc in powder form or attached to paper.

A roller is reciprocated one time thereon at a speed of about 300 mm/min. to press the test pieces. After such pressing, the remaining portion of each of the test pieces is folded at an angle of 180 degrees for 20 to 40 minutes. About 25 mm of the test piece is peeled off. Thereafter, the test piece is clamped by an upper chuck while the test plate is clamped by a lower chuck. The test piece is peeled off at a speed of 300±30 mm/min.

Every time about 20 mm of the test piece is peeled off, strength thereof is read. Such reading is conducted four times. The test is conducted on 3 test pieces. An average value of the resultant 12 measurements on the 3 test pieces is determined and, then, the average value is converted to a value per 10 mm in width based on a proportional calculation.

A test method for determining the adhesive strength of the adhesive tape for edging of the present embodiment is in accordance with the aforementioned adhesive strength test method based on a 180°-peeling method as defined in JIS Z 0237 "adhesive tape/adhesive sheet test method". However, a polyethylene terephthalate plate having a thickness of 3 mm which has been subjected to a surface treatment with a fluorine-modified silicone parting agent is used as a test plate. A specific production method of the test plate in the test method of the present embodiment is described below.

First, a fluorine-modified silicone parting agent is uniformly applied onto a surface of a polyethylene terephthalate plate having dimensions of 3 mm thick, 50 mm wide and 125 mm long by, for example, a bar coat method, in an amount in the range of from 0.3 g/m² to 0.6 g/m². Then, the polyethylene terephthalate plate coated with the fluorine-modified silicone parting agent is heated at about 150° C. for about 60 seconds.

After such heating is terminated, the side of the polyethylene terephthalate plate covered with the fluorine-modified silicone parting agent is coated with any one of ethanol, isopropyl alcohol and acetone as a cleaning liquid. Then, the cleaning liquid is wiped off by, for example, gauze. Such coating of the cleaning liquid and wiping off are repeated at least three times until the surface of the test plate is confirmed to be clean by a visual inspection. Further, as the fluorine-modified silicone parting agent, X-70-20 manufactured by Shin-Etsu Chemical Co. Ltd. is utilized in the present embodiment.

In the present embodiment, the polyethylene terephthalate plate which has been coated with the fluorine-modified silicone parting agent and then heated is also referred to as "polyethylene terephthalate test plate" for convenience.

An adhesive tape in which the adhesive strength measured by such adhesive strength test method as described above is 4 gf (0.0392 N) or more and, preferably, 6 gf (0.0588 N) or more, is strongly attached to a spectacle lens on which an antifouling layer is formed by using the fluorine-containing silane compound as described in the aforementioned publication. Thus, by interposing the adhesive tape between the chuck of the edge-machining apparatus and the lens, the axial misalignment at the time of edging can be prevented. It is preferable that the adhesive strength is 400 gf or less, but it is not limited thereto. However, when the adhesive strength of the adhesive tape is unduly large, there is a risk in that a reflection reducing coating or the like which is formed on the surface of the lens may be peeled off.

The adhesive tape 1 for edging of the present invention has a structure in which, an adhesive layer is provided on a substrate tape. As for materials for the substrate tape, illustrated but not limited thereto, are polyolefin-type resins such as polyethylene, and polypropylene; polyesters such as polystyrene, and polyethylene terephthalate; thermoplastic resins such as polyvinyl acetate, acrylonitrile butadiene styrene (ABS), a polycarbonate, a polyvinyl chloride resin, a polyamide, a polyimide, a cellulose acetate, and poly (tetrafluoroethylene); thermosetting resins such as an epoxy resin; rubber-type resins such as soft rubber, and hard rubber; and materials for reinforcing these materials, for example, a resin comprising fibrous material. Further, as for adhesives, illustrated but not limited thereto are rubber-type adhesives such as natural rubber (polyisoprene), styrene-butadiene rubber, butyl rubber, and polyisobutylene; acrylic adhesives; silicone-type adhesives; and vinyl acetate-type adhesives.

In order to prevent the axial misalignment at the time of edging, it is necessary that the adhesive tape is strongly attached to a curvature of the spectacle lens and, also, sustains a pressing force from the chuck. In order to satisfy such requirements, it is preferable that the substrate tape is selected based on its kinetic properties such as tensile strength, and elastic modulus of traction.

As for the tensile strength of the substrate tape, it is preferable that the tensile strength as defined in JIS K 7127 "plastic film/sheet tensile test method" ("JIS Handbook on Steel"; Japanese Standards Association, Apr. 12, 1989) is 1 kgf/mm² (9.8 N/mm²) or more. Further, as for the elastic modulus of traction of the substrate tape, it is preferable that a value of the elastic modulus of traction Em as defined in the aforementioned JIS K 7127 "plastic film/sheet tensile test method" is in the range of from 1 kgf/mm² to 450 kgf/mm² (from 9.8 N/mm² to 4410 N/mm²). The elastic modulus of traction refers to a region in which stress and strain are in proportion conforms to the Hooke's law. When the value of the elastic modulus of traction of the substrate tape is unduly small, a large elongation is generated by a small load. As a result, there is a possibility that an axial misalignment may occur. On the other hand, when the value of the elastic modulus of traction of the substrate tape is unduly large, there is a possibility that it may be difficult to trace along a lens shape.

The thickness of the substrate tape is 10 μm or more, preferably 20 μm or more, and most preferably 30 μm or more. Further, the maximum thereof is approximately 1 mm. The thickness of the adhesive layer is preferably in the range of from 1 μm to 100 μm. Still further, as for an area of the adhesive surface of the adhesive tape for edging, in order to secure the necessary adhesive strength against the spectacle lens, it is preferable to secure 700 mm² or more when the aforementioned adhesive strength is from 4 gf (0.0392 N) to 8 gf (0.0784 N) and 400 mm² or more when it is 8 gf (0.0784 N) or more.

A form of the substrate tape is not particularly limited so long as it has the aforementioned area. For example, a round, elliptical, or oblong shape may be used. However, as shown in FIGS. 1(A) and 1(C), when the spectacle lens is a progressive multifocal lens and the adhesive tape is attached to the convex face thereof, it is preferable that it is shaped such that it does not overlap a layout pattern which has been printed on the convex face of the progressive multifocal lens.

Figure 2:
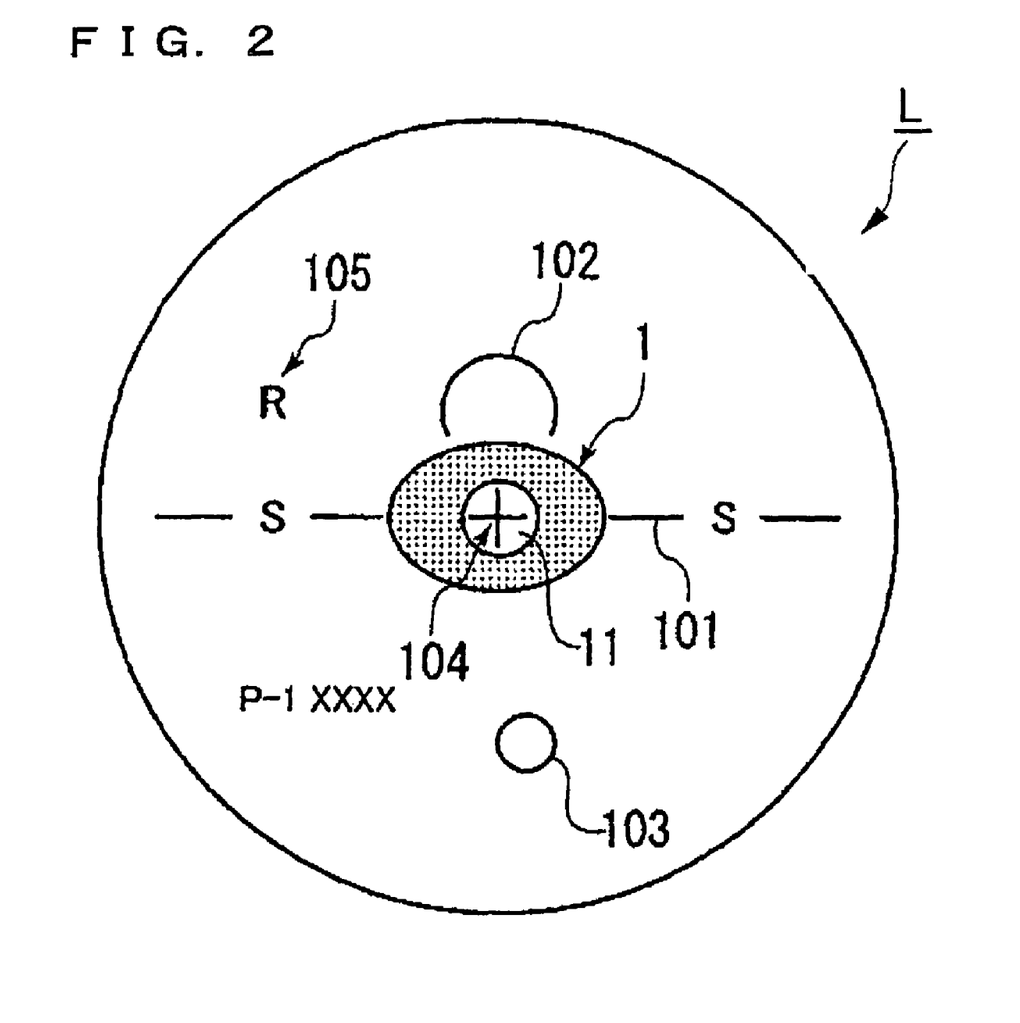
FIG. 2 is a plan view of an embodiment of a form of an adhesive tape for edging.

As shown in FIG. 2, in the convex face of the progressive multifocal lens, various types of layout patterns are marked with solvent-removable ink. These layout patterns are layout markings of, for example, a horizontal reference line 101 showing a horizontal direction of the spectacle lens, a distance power measuring position 102 showing a position at which a power of a distance portion is measured, a near power measuring position 103 showing a position at which a power of a near portion is measured, a fitting point 104, and a right-or-left recognition mark 105.

The adhesive tape 1 for edging according to the present invention is attached onto the fitting point 104 which shows an optical center. The marking of the layout pattern printed on the spectacle lens in which an antifouling layer is formed is easily removable. For this reason, when the adhesive tape 1 for edging is attached onto the layout pattern, ink of the layout pattern is attached to the adhesive tape 1 for edging. As a result, there is a risk that the layout pattern is eliminated from the surface of the spectacle lens L. It is necessary to keep the layout pattern as it is even after the edging is performed. For this account, in the adhesive tape 1 for edging, as shown in FIG. 2, a bored-through hole 11 is provided in the central portion thereof such that it does not overlap the fitting point 104 and the outer configuration is formed to be round, elliptical or oblong such that the adhesive tape does not overlap the distance power measuring position 102 provided on the fitting point 104.

As shown in FIG. 1(B), when the adhesive tape 1 for edging is attached onto the concave side of the spectacle lens L, since nothing is printed on the concave side of the spectacle lens L, the form thereof is not limited. In order to enhance the adhesive strength, the area of the adhesive lens 1 can be enlarged. For example, the adhesive tape 1 can be attached onto an entire concave face of the spectacle lens.

Structures of the adhesive tape 1 for edging and a lens lock tape 4 are described in detail below.

Figure 3A:
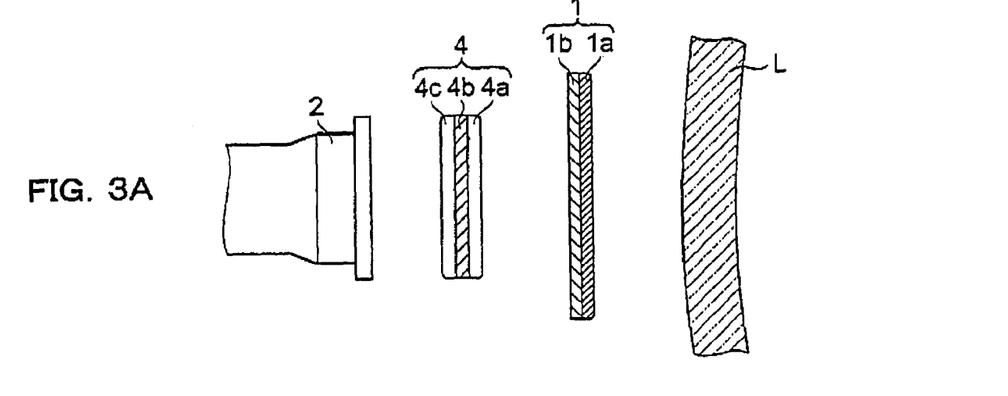
FIGS. 3(A) to 3(C) are schematic diagrams showing cross-sectional configurations of adhesive tapes for edging.

The adhesive tape 1 for edging as shown in FIG. 3(A) comprises an adhesive layer 1a and a substrate tape 1b. The substrate tape 1b has a first face and a second face which face different directions from each other. The adhesive layer 1a is positioned on the first face of the substrate tape 1b. According to the present embodiment, a measurement value of the adhesive layer 1a in the adhesive tape 1 for edging is 4 gf (0.0392 N) or more in the test method of the present embodiment. Further, the adhesive layer 1a provides an adhesive face for allowing the adhesive layer 1a to be in contact with the lens L in the adhesive tape 1 for edging.

On the other hand, the lens lock tape 4 as shown in FIG. 3(A) comprises an adhesive layer 4a, a substrate tape 4b and an adhesive layer 4c. The substrate tape 4b has a first face and a second face which face different directions from each other. And, the adhesive layer 4a is positioned on the first face of the substrate tape 4b. Further, the adhesive layer 4c is positioned on the second face of the substrate tape 4b. Since the adhesive portions (adhesive layers 4a and 4c) are provided on both faces (that is, the first and second faces) of the substrate tape 4b, the lens lock tape 4 has a function of a so-called double-faced adhesive tape.

When a lens machining work such as the edging is performed, a lens holding member (not shown) is attached onto the adhesive layer 4c. The adhesive tape 1 for edging is provided such that the adhesive layer 1a and the lens L are in contact with each other. Further, the lens lock tape 4 is provided such that the adhesive layer 4a and the second face of the substrate tape 1b are in contact with each other. In addition, the lens holding member on the adhesive layer 4c and the chuck 2 are in contact with each other. By applying pressure to a place between the chuck 2 and the chuck 3 (see FIG. 1), the lens L can be held between the chuck 2 and the chuck 3.

The aforementioned lens holding member of the present embodiment has a biting tooth on the side which contacts the adhesive layer 4c. Since the biting tooth bites into the adhesive layer 4c, the lens L is more securely held at the time of lens machining. However, the biting tooth of the lens holding member or the lens holding member itself may be omitted, depending on a rotation speed of the lens L or strength of torque to be generated by a friction between the grinding stone 5 (see FIG. 4) and the lens L at the time of machining.

Figure 3B:
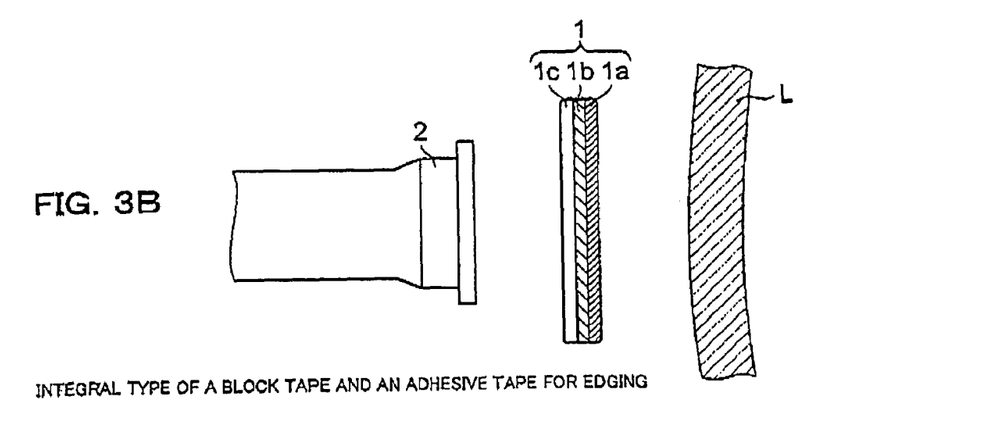
Figure 3C:
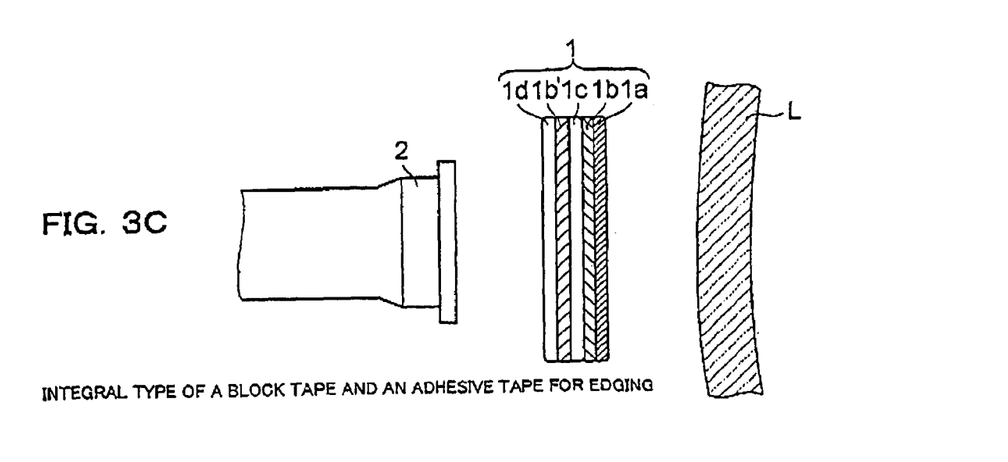

The configurations in which the biting tooth of the lens holding member and the lens holding member itself are omitted are shown in FIGS. 3(B) and 3(C), respectively. As mentioned above, the structure of the lens holding member is described in detail in JP-U No. 6-24852, an explanation thereon is omitted herein.

The adhesive tape 1 for edging as shown in FIG. 3(B) comprises an adhesive layer 1a, a substrate tape 1b and an adhesive layer 1c. The substrate tape 1b has a first face and a second face which face different directions from each other. And, the adhesive layer 1a is positioned on the first face of the substrate tape 1b and, at the same time, the adhesive layer 1c is positioned on the second face of the substrate tape 1b. According to the present embodiment, a measurement value of the adhesive strength of the adhesive layer 1a in the adhesive tape 1 for edging is 4 gf (0.0392 N) or more in the test method of the present embodiment. However, the measurement value of the adhesive strength of the adhesive layer 1c in the adhesive tape 1 for edging is not necessarily 4 gf or more in the test method according to the present embodiment. Further, since the adhesive portions (that is, adhesive layers 1a and 1c) are provided on both faces (that is, first and second faces) of the substrate tape 1b, the adhesive tape 1 for edging has a function of a double-faced tape. Further, the adhesive layer 1a provides an adhesive face for being in contact with the lens L in the adhesive tape 1 for edging.

When a lens machining work such as edging is performed, the lens holding member (not shown) is adhered onto the adhesive layer 1c. And, the adhesive layer 1a and the lens L are in contact with each other and, at the same time, the adhesive tape 1 for edging is arranged such that the lens holding member provided on the adhesive layer 1c and the surface of the chuck 2 are in contact with each other. Then, by applying pressure to a place between the chuck 2 and chuck 3 (see FIG. 1), the lens L is held between the chuck 2 and the chuck 3.

Since the adhesive layer is provided not only on the first face of the substrate tape 1b but also on the second face thereof, it is not necessary to provide the lens lock tape 4 between the chuck 2 and the lens L. Namely, the tape 1 for edging simultaneously has a function of the lens lock tape 4.

The adhesive tape 1 for edging as shown in FIG. 3(C) comprises an adhesive layer 1a, a first substrate tape 1b, an adhesive layer 1c, a second substrate tape 1b', and an adhesive layer 1d. The first substrate tape 1b has a first face and a second face which face different directions from each other. And, the adhesive layer 1a is positioned on the first face of the first substrate tape $1b$ and, at the same time, the adhesive layer $1c$ is positioned on the second face of the first substrate tape $1b$.

The second substrate tape $1b'$ has a first face and a second face which face different directions from each other. The first face of the second substrate tape $1b'$ is in contact with the adhesive layer $1c$. Namely, the first substrate tape $1b$ and the second substrate tape $1b'$ are in contact with each other indirectly through the adhesive layer $1c$. On the other hand, the adhesive layer $1d$ is positioned on the second face of the second substrate tape $1b'$.

According to the present embodiment, a measurement value of the adhesive layer $1a$ in the adhesive tape 1 for edging is 4 gf (0.0392 N) or more in the test method of the present embodiment. However, measurement value of the adhesive strength of the adhesive layers $1c$ and $1d$ in the adhesive tape 1 for edging are not necessarily 4 gf or more in the test method of the present embodiment. The adhesive layer $1a$ provides an adhesive face for being in contact with the lens L in the adhesive tape 1 for edging.

When a lens processing work such as edging is performed, the lens holding member (not shown) is adhered on the adhesive layer $1d$. The adhesive layer $1a$ and the lens L are in contact with each other. The adhesive tape 1 for edging is arranged such that the lens holding member provided on the adhesive layer $1d$ and the surface of the chuck 2 are in contact with each other. Then, by applying pressure between the chuck 2 and chuck 3 (see FIG. 1), the lens L is fixed between the chuck 2 and the chuck 3.

The edging method using the adhesive tape for edging according to the present invention does not generate the axial misalignment when the spectacle lens in which the antifouling layer is provided on a surface of the spectacle lens (namely, a slippery spectacle lens) is machined. It goes without saying that an edging method using the adhesive tape for edging according to the present embodiment does not generate the axial misalignment when the lens which does not have an antifouling layer is machined.

A material for the spectacle lens may be either inorganic glass or plastic. As for such plastics, mentioned are a diethylene glycol bisallylcarbonate (CR-39) resin, a polyurethane resin, a thiourethane resin, a polycarbonate resin, an acrylic resin and the like.

As for the antifouling layer, for example, a fluorine-containing silane compound which has been difficult to be subjected to edging as represented by the following general formula (1) is preferably used as a main component:

wherein $R_f$ represents a straight or branched perfluoroalkyl group having from 1 to 16 carbon atoms and preferably $CF_3-$, $C_2F_5-$, or $C_3F_7-$;

$R^1$ represents a hydrolysable group and preferably, for example, a halogen, $-OR^3$, $-OCOR^3$, $-OC(R^3)=C(R^4)_2$, $-ON=C(R^3)_2$, or $-ON=CR^5$ and more preferably chlorine, $-OCH_3$, $-OC_2H_5$;

$R^3$ represents an aliphatic hydrocarbon group or an aromatic hydrocarbon group;

$R^4$ represents hydrogen or a lower aliphatic hydrocarbon group;

$R^5$ represents a divalent aliphatic hydrocarbon group having from 3 to 6 carbon atoms;

$R^2$ represents hydrogen or an inactive monovalent organic group and preferably a monovalent hydrocarbon group having from 1 to 4 carbon atoms;

a, b, c, and d each individually represents an integer of from 0 to 200, and preferably from 1 to 50;

e represents 0 or 1;

m and n each individually represents an integer of from 0 to 2, and preferably 0;

P represents an integer of 1 or more, and preferably an integer of from 1 to 10. Further, a molecular weight is from $5 \times 10^2$ to $1 \times 10^5$, and preferably from $5 \times 10^2$ to $1 \times 10^4$.

Further, as one of preferable structures of the fluorine-containing silane compound represented by the aforementioned general formula (1), mentioned is a compound represented by the following general formula (2):

wherein Y represents hydrogen or a lower alkyl group;

$R^1$ represents a hydrolysable group;

q represents an integer of from 1 to 50;

m represents an integer of from 0 to 2; and r represents an integer of from 1 or less to 10 or more.

In order to form the antifouling layer in the spectacle lens by using the aforementioned fluorine-containing silane compound, a method in which the compound is dissolved in an organic solvent and, then, applied on a surface of the spectacle lens can be adopted. As for application methods, mentioned are a dipping method, a spin coat method, a spray method, a flow method, a doctor blade method, a roll coat coating, a gravure coat coating, a curtain flow coating and the like. As for such organic solvents, mentioned are perfluorohexane, perfluoromethylcyclohexane, perfluoro-1,3-dimethylcyclohexane and the like.

When diluted with the organic solvent, a concentration of the fluorine-containing silane compound is preferably in the range of from 0.03 wt % to 1 wt %. When the concentration of the compound is unduly low, since it is difficult to form the antifouling layer having a sufficient thickness, a satisfactory antifouling effect can not be obtained. On the other hand, when the concentration of the compound is unduly high, there is a risk that a film thickness of the antifouling layer becomes too thick. For this reason, after the compound is applied, there is a risk of increasing a work load such that a rinse operation may be required to eliminate coating unevenness.

Further, as for application methods of the fluorine-containing silane compound, a vacuum evaporation method in which the fluorine-containing silane compound is allowed to be evaporated in a vacuum tank and, then, deposited on a surface of the spectacle lens can also be adopted. In the vacuum evaporation method, a material compound can be used in a high concentration or without using a diluent solvent.

The thickness of the antifouling layer is not particularly limited, but generally is from 0.001 μm to 0.5 μm and, preferably, from 0.001 μm to 0.03 μm. When the film thickness of the antifouling layer is unduly small, the antifouling effect becomes scarce. Whereas when the thickness thereof is unduly large, the surface becomes sticky, which is not favorable. Further, when the antifouling layer is provided on a surface of a reflection reducing coating, the thickness of the antifouling layer of 0.03 μm or more deteriorates a reflection reducing effect, which also not favorable.

The edging method according to the present embodiment is applied to the spectacle lens having an antifouling layer comprising the fluorine-containing silane compound represented by the aforementioned general formula (1) as a main component. Namely, the adhesive tape for edging according to the present invention is attached to only the convex face, only the concave face, or both of these faces at the time of edging. Then, the adhesive tape is used in a state of being interposed between the chuck of the edge-machining apparatus, which holds the spectacle lens, and the spectacle lens. As a result, the axial misalignment in which the lens comes out of position against the chuck can be prevented.

EXAMPLE

An embodiment according to the present invention will be described below. Four types of adhesive tapes for edging were used as follows:

Adhesive Tape A for Edging:

Adhesive tape EXP 403-10 manufactured by Sun A Kaken Co., Ltd. (substrate sheet: polyethylene having a thickness of 60 μm; and adhesive layer: acrylic type having a thickness of 20 μm) was prepared as an adhesive tape A for edging. When the adhesive strength of the adhesive tape A for edging against a PET (polyethylene terephthalate) plate having a thickness of 3 mm which has been treated with X-70-201 (manufactured by Shin-Etsu Chemical Co., Ltd.) was measured in accordance with an adhesive test method based on a 180°-peeling method as defined in JIS Z 0237 "adhesive tape/adhesive sheet test method", the result was 4 gf (0.0392 N). This adhesive tape A for edging was cut in elliptical form having a vertical width of 25 mm and a horizontal width of 40 mm, provided with a bored-through hole having a diameter of about 6 mm in the center (adhesive area: 757.12 mm$^2$) and, then, put in use.

Adhesive Tape B for Edging:

Adhesive tape 731A manufactured by Sun A Kaken Co., Ltd. (PE sheet substrate having a thickness of 60 μm; and acrylic adhesive having a thickness of 10 μm) was prepared as an adhesive tape B for edging. When adhesive strength of the adhesive tape B for edging against a PET plate having a thickness of 3 mm which has been treated with X-70-201 (manufactured by Shin-Etsu Chemical Co., Ltd.) was measured in accordance with an adhesive test method based on a 180°-peeling method as defined in JIS Z 0237 "adhesive tape/adhesive sheet test method", the result was 8 gf (0.0784 N). This adhesive tape B for edging was cut in round form having a diameter of 25 mm, provided with a bored-through hole having a diameter of 6 mm in the center (adhesive area: 462.60 mm$^2$ ) and, then, put in use.

Adhesive Tape C for Edging:

A both-faced adhesive seal comprising a substrate sheet containing neoprene foam having a thickness of 1 mm and an acrylic adhesive layer of 20 μm was prepared as an adhesive tape C for edging. When the adhesive strength of the adhesive tape C for edging against a PET (polyethylene terephthalate) plate having a thickness of 3 mm which has been treated with X-70-201 (manufactured by Shin-Etsu Chemical Co., Ltd.) was measured in accordance with an adhesive test method based on a 180°-peeling method as defined in JIS Z 0237 "adhesive tape/adhesive sheet test method", the result was 10 gf. This adhesive tape C for edging was cut in round form having a diameter of 25 mm, provided with a bored-through hole having a diameter of 6 mm in the center (adhesive area: 462.60 mm$^2$) and, then, put in use.

Adhesive Tape D for Edging (Comparison):

Adhesive tape EXP 403-30 manufactured by Sun A Kaken Co., Ltd. (substrate sheet: polyethylene having a thickness of 60 μm; and adhesive: acrylic type having a thickness of 10 μm) was prepared as an adhesive tape D for edging. When the adhesive strength of the adhesive tape D for edging against a PET (polyethylene terephthalate) plate having a thickness of 3 mm which has been treated with X-70-201 (manufactured by Shin-Etsu Chemical Co., Ltd.) was measured in accordance with an adhesive test method based on a 180°-peeling method as defined in JIS Z 0237 "adhesive tape/adhesive sheet test method", the result was 2 gf. This adhesive tape D for edging was cut in elliptical form having a vertical width of 25 mm and a horizontal width of 40 mm, provided with a bored-through hole having a diameter of about 6 mm in the center (adhesive area: 757.12 mm$^2$) and, then, put in use.

By using the thus-prepared four types of adhesive tapes for edging, edging tests were conducted in a manner as described below. However, since the adhesive tape C for edging simultaneously has a function of the lens lock tape 4, tests 1 and 3 were conducted without using the lens lock tape 4.

Test 1:

As shown in FIG. 1(A), by each individually applying adhesive tapes A, B, C, and D for edging on a convex face of the lens L, respective axial misalignment tests were conducted.

Test 2:

As shown in FIG. 1(B), by each individually applying adhesive tapes A, B, C, and D for edging on the concave face of the lens L, respective axial misalignment tests were conducted.

Test 3:

As shown in FIG. 1(C), by each individually applying adhesive tapes A, B, C, and D for edging on both faces of a convex face and the concave face of the lens L, respective axial misalignment tests were conducted.

Further, as for the lens, a spectacle plastic lens (Seiko Super-Sovereign Raku Care coat, manufactured by Seiko Epson Corporation, in which an antifouling layer has been formed by performing a surface treatment with the fluorine-containing silane compound as described in the aforementioned publication) having powers of S=−7.00D and C=−3.00D was used.

Axial misalignment evaluation tests were conducted on these adhesive tapes for edging as described below.

Test Method:

The present evaluation was conducted by observing presence or absence of axial misalignment generation derived from slipping between a chuck portion (position in which lens is fixed to an axis of machining apparatus) and a surface of a lens, when the lens L is ground into a predetermined frame shape by using an edge-machining apparatus.

First, a test lens is prepared and, then, set to a lens fixing jig. At this time, the lens having astigmatism is fixed such that a cylinder axis is set to be in a predetermined direction (for example, 180°). Further, the lens having no astigmatism was ruled with a direct line which passes through an optical center of the lens. Then, the lens is fixed such that the direct line is set to be in a predetermined direction (for example, 180°). A half-eye type frame having a large aspect ratio is prepared to thereby be a reference frame.

Optionally, an adhesive tape for edging is attached to the convex or concave face of the lens. A lens lock tape is attached to the convex face of the lens. The resultant lens is fixed to an edge-machining apparatus ("LE-8080" manufactured by NIDEK Co., Ltd.) and, then, edge machining was performed based on previous frame data. The lens subjected to the edge machining is inserted into the reference frame and, then, is put to a measurement of misalignment of the cylinder axis by using a lens meter. When the direct line which passes through the optical center of the lens was ruled, a misalignment angle between such ruled line and a horizontal line which passes through an optical axis of the reference frame was measured.

Ten lenses were subjected to the edge machining and a ratio in which the axial misalignment is out of an allowable range was calculated. The allowable range of the axial misalignment was set to be ±2°.

The evaluation test results of the axial misalignment of the adhesive tape for edging are shown in Table 1. Further, occurrence of the axial misalignment was 100% when the edging was performed in a conventional method without using the adhesive tape for edging.

The adhesive tape 1 for edging according to the present embodiment is attached to a spectacle lens at the time of edging and, then, used such that it is interposed between a chuck of the edge-machining apparatus, which holds the spectacle lens, and the spectacle lens. By taking such configuration, even when a slippery antifouling layer is formed on a surface of the spectacle lens, an axial misalignment does not occur between the adhesive tape 1 and the lens. As a result, edging can be performed.

Further, by using the edging method according to the present embodiment, even when a slippery antifouling layer is formed on the spectacle lens, edging can be performed without causing the axial misalignment.

An example of applying the present invention to edging of the spectacle lens is explained; however, the present invention is not limited to the spectacle lens, but can be applied to edging of an ordinary lens.

INDUSTRIAL APPLICABILITY

The present invention can be applied to an antifouling-type spectacle lens, but is by no means limited thereto.

Although the invention has been described with respect to specific embodiments, the details are not to be construed as limitations, for it will become apparent that various embodiments, changes and modifications may be resorted to without departing from the spirit and scope thereof, and it is understood that such equivalent embodiments are intended to be included within the scope of this invention.

The invention claimed is:

1. An edging method, comprising the steps of:
attaching an adhesive tape on an antifouling layer of a lens on which the antifouling layer is provided, wherein the antifouling layer is formed by using, as a main component, a fluorine-containing silane compound; and
edging the lens by an edge-machining apparatus while the lens is held by a plurality of chucks such that the adhesive tape is interposed between the lens and at least one of the plurality of chucks in the edge-machining apparatus,
wherein the lens is maintained by the adhesive tape which comprises an adhesive face for being in contact with the lens and having a measurement value of an adhesive strength of the adhesive face being 4 gf (0.0392 N) or more when a polyethylene terephthalate plate which has been subjected to a surface treatment with a fluorine-modified silicone parting agent is used as a test

TABLE 1

Evaluation test results of axial misalignment of tape for edging

|  |  | Adhesive tape A for edging | Adhesive tape B for edging | Adhesive tape C for edging | Adhesive tape D for edging (Comparison) |
|---|---|---|---|---|---|
| Adhesive strength (gf) | | 4 | 8 | 10 | 2 |
| Adhesive area (mm$^2$) | | 757.12 | 462.60 | 462.60 | 757.12 |
| Occurrence of axial misalignment (%) | Test 1 (convex face used) | 0 | 0 | 0 | 100 |
| | Test 2 (concave face used) | 0 | 0 | 0 | 100 |
| | Test 3 (both faces used) | 0 | 0 | 0 | 80 |

The adhesive tape 1 for edging according to the present embodiment was attached to both of the convex and concave faces of the spectacle lens and the resultant spectacle lens was interposed between chucks of the edge-machining apparatus. As a result, as seen from Table 1, it was recognized that the adhesive tape 1 allows the edge machining to be performed without generating an axial misalignment even against an extremely slippery spectacle lens in which an antifouling layer was formed by performing a surface treatment by using the fluorine-containing silane compound.

plate in an adhesive strength test method based on a 180°-peeling method as defined in JIS Z 0237 "adhesive tape/adhesive sheet test method", and the elastic modulus of traction (Em) of the adhesive tape is in the range of from 1 kgf/mm² to 450 kgf/mm².

2. The edging method as set forth in claim 1, wherein the antifouling layer is formed by using as a main component a fluorine-containing silane compound as represented by the following general formula (1):

wherein $R_f$ represents a straight or branched perfluoroalkyl group having from 1 to 16 carbon atoms;

X represents iodine or hydrogen;

Y represents hydrogen or a lower alkyl group;

Z represents fluorine or a trifluoromethyl group;

$R^1$ represents a hydrolysable group;

$R^2$ represents hydrogen or an inactive monovalent organic group;

a, b, c, and d each individually represents an integer of from 0 to 200;

e represents 0 or 1;

m and n each individually represents an integer of from 0 to 2; and p represents an integer of from 1 to 10.

3. The edging method as claim 1, wherein the adhesive tape is attached to the concave face of the lens.

4. The edging method as claim 1, wherein the adhesive tape is attached to the concave face of the lens.

5. The edging method as claim 2, wherein the adhesive tape is attached to the concave face of the lens.

6. The edging method as claim 1, wherein the plurality of chucks is a pair.

* * * * *